United States Patent Office 2,702,247
Patented Feb. 15, 1955

2,702,247
PROCESSING OF RIPE BANANA FOOD

Robert T. Northcutt, Jr., Fanwood, N. J., assignor to Food Concentrates, Inc., New York, N. Y., a corporation of Delaware No Drawing. Application June 21, 1951,
Serial No. 232,880

3 Claims. (Cl. 99—154)

This invention relates to the processing of ripe banana fruit for storage and more particularly to the preparation of an hermetically sealed packaged banana product of commercially acceptable "sterility" having substantially the flavor, color and consistency and, if desired, chemical solids content, of the ripe fruit.

Bananas are in many ways an unusual fruit. Unlike others, they require artificial ripening and special refrigerated shipping care because of their perishable nature, and are only edible for a few days once they have ripened. In comparison, other fruits, such as apples, pears, peaches and citrus fruits, etc. are more readily shipped and are available to the market without spoilage over much longer periods of time. The attainment of some successful manner of preserving the banana so as to eliminate the expensive type shipping and handling and also eliminate spoilage due to their not being consumed during their short period of edibility has, for a long time, been of such utmost importance as to attract the attention of a host of experimenters. It would also permit use of reject fruit which is now discarded in the farm lands. About 1930 a special method of preservation was found by dehydrating bananas, and by continually improving the process, and using patented processes to make the product, banana powder is presently marketed under the trade-mark "Mellow Ripe Banana Powder." To date dehydrating has been the principal method of preserving ripe bananas.

Dehydrated banana has a definite place in the food industry, especially in the field of special diet foods and as a baby food. However, the product has certain drawbacks such as a tendency to cake due to warm room temperatures or from moisture absorption if the product is exposed to the average room atmosphere. Further, the powder does not resemble the fresh fruit color, flavor and consistency. Therefore, it has been the aim of many in this related field, including leading canning companies with expert research departments, to produce a canned banana which would fill this obvious void in the field of canned fruit products. This endeavor has been going on for many years.

The canning industry has many authoritative reference books for canning procedures which are well known in the industry. However, when the usual procedure indicated in such reference books is applied to bananas, the resultant product is unsalable due to either poor flavor, color or consistency. In most cases, it fails on all counts. This is due to the inability of bananas to stand up under usual canning procedures. In the canning of all food products there are certain fundamental practices which are observed by the industry and by State and Federal food control agencies. One of these basic principles is that when food has a pH of over approximately 4.5, it requires processing at a temperature higher than that of boiling water (usually about 240° F.) for a specified time (which is usually 15 to 20 min. for #1 or #2 cans). Bananas have a pH well above 4.5 and may even be found with a pH of 5.0 or higher. It is, therefore, necessary to select the proper procedure for temperature and time which will adequately sterilize the product at a pH of 5.0 or higher. When experimenters follow the recommended time and temperature procedure as specified in canning procedure manuals, they obtain canned banana which has a reddish to purple color, a grain jelly-like consistency and an unsatisfactory flavor and odor wholly unlike that of the fresh fruit. They have to admit that the banana is unusual, if not unique.

Further experiments were along the line of reducing temperature and time to a minimum point in so far as good recognized canning practice would permit. However, even when they had gone to the limit along these lines they still had an unacceptable product. Reputable experimenters would not reduce the time and temperature below a certain point because bananas and other foods with pH over 4.5 are referred to as "non-acid" and are considered susceptible to the growth of heat resistant bacteria unless they are properly sterilized. Outstanding in this group of heat resistant bacteria is Botulinus which is apt to be deadly if eaten. Under the circumstances, they tried alternative methods of canning, one of which is to lower the pH by the addition of acid. This permits a lesser degree of time and temperature requirements while still maintaining effective sterilization. I have found that even such lesser recommended time and temperature as specified for acid foods results in a poor product unacceptable by the trade. In addition, the added acid is uncomplementary to bananas insofar as flavor is concerned. There are other alternatives, such as the addition of sugar or other preservatives. However, in every case I have known where additions along these lines were made, an unsatisfactory product resulted.

While my experiments demonstrated that there were many things which would contribute to making an improved canned banana, such as the removal of product gases, exclusion of atmospheric oxygen during processing, dipping in ascorbic acid (or similar anti-oxidizing solutions and treatments), exclusions of objectionable metals in the process and use of various chemicals which would preserve to some degree the desired characteristic of banana; all of them put together did not help enough alone to make a satisfactory product. A correct basic canning process still remained to be found.

I have now discovered at long last that I, as well as prior workers, made a basic error in believing that bananas had, so to speak, a critical flavor-preserving temperature which was lower than the permissible sterilizing temperature under standard canning practice for a non-acid fruit; and that if the bananas were subjected to a temperature above the critical temperature in an effort to attain a sterilized product, in accordance with accepted practice, loss of flavor was inevitable.

I have discovered that if one operates in a certain extreme temperature range while subjecting the bananas to that temperature for a period of time only sufficiently long to produce adequate sterilization at that temperature under recognized canning practices, a banana product of fresh fruit flavor, consistency, color and odor can be attained, particularly when various other good canning precautions, previously enumerated, including degassing, are taken. In other words, I have discovered that time of heat treatment and not the temperature is the flavor-destroying culprit in banana processing; I therefore reduce the time of treatment to a point which is acceptable from the flavor-retaining standpoint and then adopt a temperature in the range which is necessary to control bacterial growth under accepted standards for that time of treatment.

Experiments now conclusively show that bananas can be raised to temperatures in the range of 250° to 300° F. for short periods of time, and yet produce a canned product which closely resembles fresh fruit and is sterile by all recognized standards.

The uniqueness of bananas, therefore, is that, unlike most food products, its time of treatment is more critical than its temperature; it cannot tolerate much time but can withstand extreme temperature—extreme enough to suffice for sterilization despite the very short time of exposure.

The following illustrates a method for the production of my bananas. The bananas are ripened by conventional methods to any desired degree of ripeness. They are peeled and put into a grinding or pulping machine which converts the product into a pumpable mass. During this operation, the banana should be protected from exposure to air as oxidation rapidly takes place. Flushing the inside of the equipment with nitrogen, carbon dioxide, or other inert gases reduces objectionable oxidation. The pure banana is then pumped into small diameter tubular heat exchangers which are designed to rapidly raise the temperature to between approximately 240° F. and 300° F. as quickly as possible. The time of treatment should not exceed 10 to 15 seconds and should preferably be accomplished in not more than 6 seconds. The material is then held at this temperature for about the same time range. (For an example, we have obtained excellent results by using 2.1 seconds for the time of heating to 286° F., followed by holding the product at this temperature for a period of 4.4 seconds.) The material is then instantly cooled by passing through a cooling coil. The material at this point is sterilized according to accepted canning rules, for elimination of organisms, molds, etc. The cool product is then filled into cans or other containers which have been previously sterilized and held in readiness in an aseptic chamber so as to receive the processed banana. The container is sealed while it is still in this aseptic chamber. It should be noted that before the banana is filled into the sterile can it should be cooled preferably to room temperature, and not over 100° F. This eliminates the possibility of the banana changing due to residual heat while in the can, as even this can be detrimental to the product.

My procedure permits the filling of small cans (4 oz.) or large cans (#10 tins), or even drums, and in each case the product will receive the same time and temperature treatments. This is not practical when the product is filled hot into containers. In order to obtain the desired vacuum pack, the can is flushed with superheated steam, e. g. 300° F. at atmospheric pressure, during the filling and closing process. The steam which is enclosed in the sealed can condenses and creates a vacuum. It is necessary that the sterilized cooled banana be rapidly filled into the can and removed from the heated aseptic area so as to eliminate any appreciable temperature gain in the product.

The above described process is not intended to be limiting as to the only means for the successful operation of the basic principles involved. One may for instance eliminate tubes in the heat exchanger and by using other mechanical means expose slices or piece-sized portions to similar heat and cooling conditions. Also, it is not necessary to use steam as the means to create the aseptic filling, sealing and vacuum conditions as described above. It may prove more desirable to use mechanical means to produce the vacuum. There are many possible variations of the mechanical means or equipment which may be used in the actual plant operation under my process.

In deciding what temperature is required in a particular case, one may follow the well-known formulae and tables of C. O. Ball, i. e. for a 6-second operation, one may utilize a temperature of 268° F., but a sterility factor value of 10 will dictate the desirable use of 18° F. more, i. e. 286° F., which, under Ball's tables would theoretically require only $\frac{1}{100}$ of a second, his tables, indicating that for each 18° F. increment, the time can be reduced by 90% while maintaining the same degree of sterilization. However, all of the Ball data that deal with sterilization temperatures for periods of maintained temperature exceeding 30 seconds, universally useful for all other foods, are wholly useless for, and inapplicable to, satisfactory canned banana production.

My process does not necessitate the exclusion of other ingredients, for the purpose either of reducing the total banana content or the temperature requirements while maintaining a safe sterility factor value. Thus, the addition of sugar or of pH reducing acids or acid foods, or a combination thereof, can permit use of slightly lower temperature for a given treatment period, though such temperature reductions are small, i. e. of the order of only a few degrees F., if the sterility factor remains the same, unless the additions are so great in quantity as to cause appreciable departure from the natural ripe banana fruit flavor—a result which is beyond the intent of this invention.

I claim:

1. The method of preparing a sterile banana product for storage comprising heating ripe macerated banana fruit to a temperature of from 240°–300° F. maintained for a period of time not exceeding 15 seconds and rapidly cooling the fruit to less than 100° F.

2. The method of packaging a sterile banana product comprising heating ripe macerated banana fruit to a temperature of about 286° F. maintained for a period of time not exceeding about 6 seconds, then rapidly cooling the fruit and hermetically sealing the cooled fruit in a package at a fruit temperature less than 100° F.

3. The method of packaging bananas as claimed in claim 2, wherein the fruit is vacuum-sealed in said package.

References Cited in the file of this patent

UNITED STATES PATENTS

| | | |
|---|---|---|
| 1,089,215 | Heine | Mar. 3, 1914 |
| 1,138,887 | Plunkett | May 11, 1915 |
| 2,507,564 | Foote | May 16, 1950 |